United States Patent Office 2,943,069
Patented June 28, 1960

2,943,069

OXIDIZED POLYETHYLENE WAX COMPOSITIONS OF CONTROLLED HIGH MELT VISCOSITIES AND PROCESS FOR PREPARING THEM

Robert Rosenbaum, Buffalo, N.Y., assignor to Allied Chemical Corporation, a corporation of New York No Drawing. Filed Nov. 27, 1956, Ser. No. 624,508

15 Claims. (Cl. 260—23)

This invention relates to new compositions of matter comprising oxidized polyethylene wax and a metallic soap of a higher fatty acid having controlled potentially high melt viscosities and to a process for preparing such compositions.

It is well known to prepare waxy coating materials using a wide variety of waxes and blends of waxes with various modifiers including water insoluble soaps of higher fatty acids and to apply such wax compositions to base surfaces in the molten state, and to congeal the coating on the surface by cooling. It is also known to dissolve such compositions in solvents or emulsify them in non-solvents and to apply the resulting dispersions to surfaces.

Most waxes adapted to produce useful coatings when rendered fluent by heating above their melting points, produce liquids of extremely low viscosities so that in their application to porous surfaces such as paper, excessive penetration of such waxes into the paper occurs, such that the paper is either impregnated throughout so that it cannot be printed, even on its reverse side, or a thin, non-uniform coating is deposited on the surface of the paper which lacks moisture resistance because of surface protruding fibres which draw moisture into the coated sheet. Both types of coatings are deficient in heat sealing properties. When applied to non-porous surfaces such as metals, such molten wax coatings are often too thin to offer adequate protection in a single coat and tend to be uneven because of extensive run-off of the extremely thin, low-viscosity liquid. These thin coatings are unsuited for so-called "hot melt" application to produce thick coats in a single application.

Many efforts have been made in the past to improve the various waxy coatings with respect to reduced penetration, improvement in heat-sealing and non-blocking tendencies and other requirements, including control of viscosity, flow characteristics and coating thickness so that they may be applied as "hot melt."

One such effort has involved blending a microcrystalline wax with aluminum soaps of higher fatty acids such as aluminum stearate, etc., to produce elastic "gels" of maximum viscosity and thixotropic characteristics, and then conditioning the gel by heating, or mixing at elevated temperatures, so that its viscosity is reduced to the desired extent to provide a coating of suitable high viscosity for spreading on sheet material such as paper. By this process the waxy composition may be applied in the molten state at a viscosity substantially higher than that of the melted wax at the application temperature, and viscosity may be controlled downward, within limits, to that best adapted for the particular surface or coating machine by adjusting the conditioning step to produce the desired viscosity.

Such coatings, while representing a decided advance in the art of application of waxes in hot-melt coatings, nevertheless are lacking in many desired characteristics. For example, they are not as hard as desired, and, under certain conditions encountered in manufacture or use, tend to "block" or stick together under conditions of heat or pressure, as when the coated surface material is wound in rolls or stacked in piles, requiring dusting with starch, talc, or other powdered material to avoid blocking.

In the manufacture of "end labels" used to seal the ends of paper bread wrappers, the individual labels are punched out of the coated paper by dies. If the coating is too soft, the dies soon become covered with coating, producing a ragged cut until they are cleaned, and, particularly if the soft coating has been dusted, the dies soon become dulled and wear out due to the abrasive action of the dust coat. If such microcrystalline wax coatings were used in coating the interiors of food or beverage containers whose contents are subsequently to be pasteurized, i.e. heated to 145°–155° F., temperatures approaching the melting points of such coatings, the coatings would soften and tend to flow, resulting in a thinning and weakening of the coat and loss of protective value in the coating. Furthermore, in order to obtain the desired coating viscosities using microcrystalline wax, relatively large proportions of aluminum soaps must be employed, for example, up to about 20% in some cases.

The above prior art process of preparing the coating is itself subject to serious disadvantages; for example, the step of "conditioning" the coating, after the gel is broken, is time consuming and may require as much as six hours or more. Furthermore, if best results are to be obtained, the viscous coating must not be allowed to congeal after conditioning, and thus must be stored at elevated temperature—above the gel point—until it is applied to the surface. Under such conditions, however, such prior art coatings suffer a rapid, progressive decrease in viscosity, for example, they may experience a drop of 30,000 centipoises by storage at 250° F. for a period of 5 hours or less, so that prolonged high temperature storage of such compositions cannot be tolerated.

It is known that polyethylene waxes have high degrees of hardness and other desirable characteristics. However, efforts to improve the hardness of the above coatings by the use of hard polyethylene waxes failed as the polyethylene waxes were found incapable of thickening or "gelling" in combination with aluminum soaps, and produced instead, compositions having substantially the original viscosity of the polyethylene.

Thus, the high molecular weight polyethylenes are too viscous for ready application, the low molecular weight polyethylenes too fluid. For example, polyethylene isopropanol telomer waxes having average molecular weights between about 1,000 and about 5,000 have melt viscosities of between about 100 and about 450 centipoises at 260° F., while blends of up to about 10% of aluminum soaps of higher fatty acids with such polyethylene waxes have only slightly higher melt viscosities. These viscosities are not altered appreciably by heating or cooling either the wax alone or the blends, within the temperature range above their melting points, and are too low for optimum application to surfaces of thick coats in a single operation. Such blends, moreover, are completely lacking in homogeneity, tending to separate on standing or heating, and are thus totally unsuited for coating applications of any of the usual types even those requiring low viscosities, such as are used in ordinary wax paper coating by immersion techniques.

Moreover, while blends of small amounts of aluminum soaps of higher fatty acids with polyethylenes of average molecular weights varying over a wide range, e.g. 800 to 20,000 have been made, in such compositions, the soaps act as a lubricant or release agent since they appear to be only superficially compatible with polyethylenes, and consequently tend to exude and separate from the blends and provide slippage and non-adherence of the blended material to surfaces and ready release from rolls when the paper or other base coated therewith is calendered. Such polyethylene-aluminum soap compositions thus do not adhere tenaciously to metals or even to paper, and may readily be stripped from paper surfaces such as glassine to produce self sustaining films. Such blends are accordingly unsuited for coating surfaces where a high degree of adhesion of the coating to the base is required.

It is an object of the present invention to provide a waxy composition having potential melt viscosities within the range between about 1,000 centipoises and about 2,000,000 centipoises or higher, at temperatures between about 230° F. and about 300° F. adapted for application to surfaces before or after development of increased viscosity and which in the high viscosity state may be stored in the molten condition at elevated temperatures for relatively long periods without a decrease in viscosity.

Another object of the invention is to provide a viscous, waxy coating composition adapted for hot melt or extrusion application which has a smooth, flowable consistency.

A still further object of the invention is to provide a process for preparing such compositions.

These and other objects are accomplished according to my invention wherein an oxidized polyethylene wax as hereinafter defined is heated with a small quantity of an aluminum soap of a higher saturated aliphatic acid, such as aluminum stearate, to a temperature sufficiently above the melting point of the oxidized polyethylene wax to produce a thickened, thixotropic composition and thereafter the thixotropic composition is condition to a smooth, viscous, liquid of greatly increased viscosity.

I have found that the difficulties and inadequacies of the prior art coatings of the wax-soap "gel" type may be overcome by use of the oxidized polyethylene wax-aluminum soap composition as the entire coating composition or by addition to such prior art mixtures of small but adequate quantities of oxidized polyethylene, sufficient to confer the desired properties of maintenance of high viscosity on high temperature storage, hardness of resulting coat, non-blocking characteristics, achievement of high viscosities with relatively lower aluminum salt contents, superior adhesion to surfaces, etc.

In carrying out the process according to my invention, the oxidized polyethylene wax, as defined, is melted and brought to a temperature slightly above its melting point. At this stage the melted, oxidized polyethylene wax is an extremely fluid liquid having viscosity characteristics, for example, of about 100 cp. to about 300 cp. The aluminum soap of a higher aliphatic acid is then added with stirring, which is continued until the soap is well dispersed in the wax. During dispersion, the temperature may be maintained at a point slightly above the melting point of the wax, for example, between about 205° F. and about 215° F., or may be allowed to drop somewhat, for example, as much as about 30° F., e.g. to 185–205° F. In the latter case, a pasty mass is formed in which dispersion of the soap may be effected more rapidly than at the higher temperature at which the mixture is more fluid.

When the soap is well dispersed, the temperature of the mixture is raised, for example, to between about 250° F. and about 350° F., agitation being continued, preferably in a mechanical mixer such as a dough mixer. The temperature rise results in no immediate marked increase in viscosity of the blend until, rather suddenly, the mixture thickens and attains its maximum viscosity at a definite temperature, depending on the particular metallic salt used.

At this stage, the composition is a doughy, "short," rather brittle mass, devoid of desirable flow properties and in no condition for use as a "hot melt" coating or even for extrusion purposes. If attempts are made to pour or flow the composition at this stage, it will tend to break off in chunks or "gobs" rather than flowing smoothly as a homogeneous film or mass.

After reaching the short, thickened stage, therefore, in order to impart the desired flow characteristics to the composition, heating is continued, with or without agitation, resulting in conversion of the short doughy mass to a smooth, flowable, viscous liquid.

The viscosity of the composition after breakdown of the short doughy mass and heat treating for the minimum time necessary to produce a smooth viscous fluid suitable for coating, which will be referred to herein as the "initial viscosity" of the coating, will depend on the quantity and character of the aluminum soap used. Such initial viscosity may range from about a thousand centipoises (at 260° F.) to well over a million centipoises at the same temperature, using proportions of aluminum soap of from about 1% to about 10% based on the weight of the oxidized polyethylene wax.

Upon further heating or storage at elevated temperatures of compositions containing a waxy component, primarily the oxidized polyethylene wax, the viscosity of the composition continues to increase while the composition remains flowable, for a considerable period, for example, for several days, and then remains substantially constant for an extended period before decreasing. The maximum point reached depends largely on the amount of aluminum soap in the blend, larger amounts of soaps within the range specified producing greater viscosity increases. Substantially greater increases in viscosities are obtained with the oxidized polyethylene wax-aluminum soap blends than are obtained with microcrystalline waxes using the same proportions of aluminum soaps. The particular soap employed may also influence the maximum obtained.

Suitable mixtures of oxidized polyethylene wax with microcrystalline wax, blended with aluminum soaps according to my invention can be made in which a wide range of melt viscosities may be obtained and which, after conditioning, will remain substantially unchanged upon storage of the molten composition at elevated temperatures for as long as a week or ten days or more.

It is thus possible, according to my invention, to obtain viscous blends of an extremely wide range of viscosities ranging for example, from stiff plastics suitable for extrusion, through flowable coatings suitable for application to surfaces such as paper, board, metal, etc., at viscosities ranging from the maximum indicated above down to about a thousand centipoises.

Thus, different types of coating applications require different viscosities. For example, optimum "hot melt" coating viscosities usually lie between about 1,000 centipoises and about 5,000 centipoises at application temperatures; reverse roll coating, for example, may be practiced at coating viscosities between about 2,000 and about 100,000 centipoises; extrusion viscosities may be in the range from about 30,000 to about 2,000,000 centipoises or higher. Spray or dip coatings, on the other hand, may have viscosities in the neighborhood of, for example, about 100–500 centipoises.

Appreciable viscosity increases may be obtained using extremely small proportions of aluminum soaps, insufficient to cause significant changes in hardness and non-blocking characteristics of the resulting coatings, particularly if such coatings are heat conditioned to the maximum viscosity after resolution from their initial short doughy state.

Thus, the compositions of my invention may be controlled to assume a predetermined melt viscosity at elevated temperatures within the wide range indicated. The compositions may, therefore, be said to have "potential melt viscosities" within this range. Whenever the term "potential melt viscosity" is used in the specification and claims herein, it is to be understood as meaning that the composition in question is capable of assuming the melt viscosity indicated, and of maintaining this melt viscosity at the indicated temperature at least for a period sufficient for its application to a surface.

The oxidized polyethylene waxes suitable for use in the process of my invention have average molecular weights between about 1,000 and about 5,000. They may be prepared according to the process of copending application S.N. 515,770, filed June 15, 1955, of Michael Erchak, Jr., or S.N. 524,620, filed July 26, 1955, of Wilbur F. Chapman and John N. Cosby. Especially suitable are those obtained by oxidizing a polyethylene wax prepared by polymerizing ethylene in the presence of a co-reactant such as a normally liquid organic compound free of olefinic unsaturation, e.g. consisting of carbon, hydrogen and oxygen, or carbon, hydrogen and halogen, for example, an alcohol such as isopropanol, an ester, e.g. methyl propionate, a ketone, such as acetone, an ether, an alkane, an alkyl benzene, etc., as disclosed in U.S. Patents 2,683,141 and 2,504,400 of Michael Erchak, Jr. Such polyethylene waxes may contain a terminal group derived from the co-reactant. I prefer to use the oxidized polyethylene waxes as described above, which contain between about 2% and about 7% of oxygen and which have acid numbers between about 11 and about 20, and have average molecular weights between about 1,000 and about 3,000. These oxidized polyethylene waxes have superior hardness and toughness characteristics, usually having penetration values not more than about 1.5 mm. as measured by Standard ASTM method D–5–25, and toughness values of at least about 2.0 foot pounds per linear inch as measured by Standard ASTM method D256–47T. The oxidized polyethylene/isopropanol telomer waxes having average molecular weights between about 1,000 and about 3,000 are especially preferred.

Coating compositions according to my invention may consist solely of oxidized polyethylene wax and water-insoluble aluminum soap of a higher fatty acid, or other additives may be included such as other waxes, particularly microcrystalline waxes, mineral oil, resins, fillers, pigments, dyes and the like. Such additives are preferably added to the molten oxidized polyethylene wax-aluminum soap dispersion and dispersed therein at temperatures below the thickening point of the mixture. The temperature is then raised to the thickening point in the usual way, and mixing continued thereafter until a smooth, flowable composition is obtained.

Thus, the amount of the oxidized polyethylene wax will vary depending on the ultimate use to which the resulting composition is to be put. To obtain the benefits of the oxidized polyethylene wax, however, compositions should contain at least about 5% of the oxidized polyethylene wax, preferably at least 10%. In general, proportions between about 5% and about 99% by weight based on the total composition may be used. When proportions below about 50% are used, a sufficient quantity of another aluminum soap-thickenable material such as microcrystalline wax, mineral oils etc. must be used to bring the total of such thickenable components to about 50%. The remainder of the composition may be made up of well known coating additives such as resins, pigments, dyes and the like.

Suitable water insoluble aluminum salts of higher aliphatic acids are the aluminum mono- and poly-salts of saturated aliphatic monocarboxylic acids having from 8 to 20 carbon atoms, e.g. stearic acid, palmitic acid, lauric acid, caprylic acid, etc. The readily available aluminum distearate of commerce is suitable for most purposes. The tristearate and the mono stearate may also be used, but give lesser viscosity increases. Where an exceptionally stiff dough is required, I prefer to use aluminum octoate (caprylate). Mixtures of such soaps may be used if desired.

I have found that extremely small proportions of aluminum soap will produce the desired thickening effect when heated with the oxidized polyethylene wax according to my invention. The minimum amount necessary will depend somewhat on the particular soap used, and the presence and amounts of other additives in the compositions. In general, I prefer to employ at least about 1% of aluminum soap based on the oxidized polyethylene wax used and quantities of no more than about 10% usually are sufficient, although somewhat higher amounts do no harm. In compositions containing additives such as micro-crystalline wax and mineral oils, which are themselves thickened to some extent by the aluminum soap, as pointed out above, I prefer to use at least about 5% of the oxidized polyethylene wax, and to furnish between about 1% and about 10% of aluminum soap based on the total weight of the thickenable material in the composition.

The compositions of my invention may be applied as high viscosity, hot-melt coatings after the steps of dispersing the soap, thickening the mixture and reducing the dough to a viscous fluid of the desired viscosity, or, if desired, the composition may be applied to a surface in its low viscosity state after blending wax and soap above the melting point of the wax but below the thickening point of the mixture. Such unthickened coatings may be applied by the customary low viscosity coating equipment, including spraying, and thereafter subjected to heat to set the coating, and thus minimize run-off and sagging. Coatings applied in this low viscosity state, e.g., 100–450 cp. have the characteristic high potential melt viscosities of their compositions, which may be developed after application to a surface as indicated. Low viscosity coating in this manner is especially useful in coating metal objects such as beverage cans by dipping or spraying, when followed by immediate heating above the thickening point of the composition, and subsequent cooling, or by application to preheated surfaces to cause immediate thickening and setting.

The following examples further illustrate my invention. Parts are by weight except as otherwise noted.

EXAMPLE 1

Twelve hundred parts of an oxidized polyethylene/isopropanol telomer wax having an average molecular weight of about 1500 containing about 3% oxygen, having a penetration according to ASTM method D–5–25, of 0.2–0.4 mm., and acid number about 15 and a melting point of about 208–212° F., was melted by heating to 215° F. in a dough mixer. While maintaining the temperature between about 180° F. and about 215° F., 60 parts of aluminum distearate (4.76% based on the total weight of the mixture), was added to the molten wax with continuous stirring until the soap was well dispersed, the operation consuming about 20 minutes. At this stage, the wax-soap blend had a melt viscosity of about 250 centipoises. The mixture was then heated gradually, with stirring, to 230° F., at which temperature the dispersion set to a thixotropic doughy mass. The temperature of the doughy mass was then gradually raised to 260° F., while continuing the agitation in the mixer. After about 90 minutes from the time of setting, the mixture appeared to have assumed a smoothness and flowability suitable for coating; the viscosity was found to be 15,400 centipoises, as measured in a Brookfield rotation viscometer.

A portion of the above composition was poured into a mold and allowed to come to room temperature (about 25° C.), whereupon it congealed to a hard, tough solid.

It was tested for hardness according to ASTM method D-5-25 and found to have a penetration of 0.4 mm.

Paper coated with the above composition (prior to cooling) is heat sealing at temperatures of about 200° F. and above and is non-blocking at temperatures up to about 125° F. measured as the 50% block temperature according to the Standard Gradient Method, these temperatures being well above those usually encountered in ordinary reeling operations and thus high enough not to require dusting.

A coating composition prepared in a manner identical with that above described, except that microcrystalline wax was substituted for the oxidized polyethylene wax, had a viscosity after conditioning, for the same period, of only 3,240 centipoises at 260° F., and produced a composition, which, after congealing, had a penetration of 1.8 mm. according to ASTM D-5-25 test method. Paper coated with the microcrystalline wax-aluminum stearate composition was non-blocking up to a temperature of only about 100° F., by the above test requiring starch dusting to prevent sticking when wound into rolls.

EXAMPLE 2

A coating composition was prepared in the same manner as that described under Example 1 above, containing

|  | Percent |
|---|---|
| Oxidized polyethylene wax | 95 |
| Aluminum octoate | 5 |
|  | 100 | by melting the oxidized polyethylene wax, and adding aluminum octoate at about 180-215° F., then raising the temperature to 260° F. An extremely stiff dough was obtained. Upon agitating the dough at 260° F. for 90 minutes, a flowable composition was obtained suitable for extrusion, having a viscosity of over 2,000,000 centipoises. The composition maintained its high viscosity indefinitely at the above temperature. After cooling and congealing, the composition had a penetration value of 0.35 mm.

EXAMPLE 3

A coating composition was prepared containing

|  | Percent |
|---|---|
| Oxidized polyethylene wax | 10 |
| Microcrystalline wax | 84 |
| Aluminum stearate | 6 |
|  | 100 | by melting together the oxidized polyethylene wax and microcrystalline wax, then adding the aluminum stearate to the melted wax mixture. Upon heating to 230° F. a stiff dough formed. Upon raising the temperature to 260° F. and agitating for 90 minutes a flowable composition suitable for hot-melt coating was obtained having a viscosity of about 20,000 centipoises at 260° F. After congealing, the coating had a penetration of 1.2 mm.

EXAMPLE 4

A composition was prepared containing

|  | Percent |
|---|---|
| Oxidized polyethylene wax | 10 |
| Mineral oil | 84 |
| Aluminum distearate | 6 |
|  | 100 | by melting together the wax and oil at about 215° F., then adding aluminum stearate to the molten mixture at that temperature and agitating until the soap was well dispersed. The temperature was then raised to 260° F. whereupon a thixotropic mass was obtained which was a smooth greaselike material suitable for use as so-called "specialty greases" in application where extreme conditions are found such as high pressures or temperatures or exposures to corrosive chemicals. It had a viscosity at 260° F. of 23,000 cp. The unworked grease-cone penetration was 29.9 mm.

EXAMPLE 5

A series of five tests were carried out to demonstrate the effect on viscosity of varying amounts of aluminum soap in the oxidized polyethylene wax-aluminum soap composition.

In these tests, oxidized polyethylene/isopropanol telomer wax of the character described in Example 1, was melted in a dough mixer. The temperature of the melted wax was brought to 210° F. and the mixer started. In the several tests, amounts of aluminum distearate were added, ranging from 1 to 10%, and a control was run containing no stearate. After addition of stearate, mixing was continued until the stearate was completely dispersed in the wax. The temperature during blending was about 200° F. which produced a pasty mass facilitating dispersion of soap, which required about half an hour. After dispersion of wax and soap had been accomplished, the temperatures of the mixtures were raised to 230° F. whereupon the mixtures first became fluid then thickened to a doughy mass. The temperature was then raised to 260° F. while continuing agitation in the mixer for about an hour to smooth out the coating and render it flowable. The coating was then removed from the mixer and allowed to stand quiescent for a period of several hours at 270°-280° F. until all the air bubbles had discharged from the mixture, whereupon viscosities of the mixtures were determined in a Brookfield viscosimeter at 260° F. with the results shown in Table I below.

Table I

MELT VISCOSITIES OF OXIDIZED POLYETHYLENE WAX-ALUMINUM STEARATE BLENDS CONTAINING VARYING AMOUNTS OF ALUMINUM STEARATE

Percent aluminum stearate:

| | Viscosity at 260° F., centipoises |
|---|---|
| 0 | 260 |
| 1.0 | 320 |
| 3.0 | 700 |
| 4.76 | 15,200 |
| 10.0 | 1,060,000 |

The above are the initial viscosities of the mixtures and are all subject to increase on heat-conditioning.

EXAMPLE 6

To illustrate the viscosity changes which occur upon heat conditioning of an oxidized polyethylene wax-aluminum soap mixture the following test was run.

Four and three-quarter parts of aluminum stearate were mixed with 95¼ parts of melted oxidized polyethylene/isopropanol telomer wax of the character described in Example 1 and blended at temperatures of 190°-210° F. in a dough mixer for about one-half hour. The temperature of the mixture was then raised to 230° F. whereupon it set to a doughy mass. The dough was removed from the mixer and stored in an oven at 275° F. for 185 hours during which time melt viscosity readings at 260° F. were taken at approximately daily intervals with the results indicated in Table II below.

Table II

EFFECT OF HEAT CONDITIONING AT 275° F. ON MELT VISCOSITY OF OXIDIZED POLYETHYLENE WAX-ALUMINUM STEARATE COMPOSITIONS CONTAINING 4.75% ALUMINUM

| Time, hours: | Viscosity, centipoises, at 260° F. |
|---|---|
| Initial | 15,200 |
| 21 | 32,240 |
| 48 | 48,500 |
| 65 | 64,000 |
| 89 | 79,000 |
| 161 | 228,000 |
| 185 | 220,000 |

EXAMPLE 7

A dough of 4% aluminum stearate in 96% oxidized polyethylene/isopropanol telomer wax was prepared as described under Example 5. The dough was heated to 260° F. for 90 minutes causing the dough to smooth out, producing a mobile mass having a viscosity at 260° F. of about 8,000 centipoises. Metal beverage cans of dimensions of about 4⅝ inches in length by about 2⅝ inches diameter, open at one end were about half filled with the coating, then turned over and allowed to drain for a few seconds to remove the bulk of the coating, then placed on a rack and allowed to drain in an oven for 15–25 minutes at 325° F., i.e., until enough had drained off to leave a coating of about 3 grams on the can.

The coatings were then allowed to cool whereupon the coating congealed to form a smooth, hard, flexible, moisture resistant coating on the can interior. Coatings of up to about 6 mm. thickness were thus formed with no cracking tendencies. Thicker coatings tended to crack slightly.

EXAMPLE 8

A dough was prepared by mixing 20 parts of ester gum (Staybelite Ester No. 10) and 4 parts of aluminum stearate with 76 parts of molten, oxidized polyethylene/isopropanol telomer wax and blending in a dough mixer at 180°–210° F. The mixture was then heated to 230° F. whereupon a dough formed. Upon further heating at 260° F. for about 90 minutes the dough smoothed, became flowable and produced a mobile mass having a viscosity of about 6,000 centipoises at 260° F. The interiors of metal beverage cans were coated as described in Example 7, and cooled to congeal the coating. The resulting coatings were hard, smooth, flexible and moisture resistant. With the above formula coatings of thicknesses up to 8 mm. evidenced no tendency to crack on congealing.

EXAMPLE 9

Four parts of aluminum stearate were dispersed in 96 parts of oxidized polyethylene/isopropanol telomer wax at a temperature of 180°–210° F. After thorough blending the temperature of the mixture was raised to 230° F., i.e., insufficient to cause thickening of the mixture. The viscosity of the mixture was about 250 centipoises. The interiors of metal beverage cans were "slush coated" with the above mixture, i.e. the cans were filled with the mixture, inverted, to remove the bulk of the coating and then allowed to drain on a rack in an oven at 300°–325° F. until the desired amount of coating remained on the can surface, i.e., 2–4 grams per can. Draining in this case required only about 3–5 minutes. The cans were then cooled to room temperature (about 70° F.) whereupon the coatings congealed to produce a smooth, hard, flexible, moisture resistant surface.

EXAMPLE 10

A coating composition was prepared containing

|  | Percent |
|---|---|
| Oxidized polyethylene wax | 47.4 |
| Microcrystalline wax | 47.4 |
| Aluminum distearate | 5.2 |
|  | 100.0 | by melting the waxes together, adding aluminum distearate thereto and stirring until wax and stearate were well dispersed at a temperature of about 200° F. The mixture was then heated to about 250° F. to thicken it and then stirred until smooth and free flowing. The mixture was maintained for the next thirteen days at a temperature between about 250° F. and about 260° F., with stirring during 8 hours of the day. Viscosity determinations were made at intervals during the 13 days with the results shown in Table III below.

Table III

EFFECT OF CONDITIONING FOLLOWED BY HOT STORAGE ON VISCOSITY OF OXIDIZED POLYETHYLENE WAX-MICROCRYSTALLINE WAX BLENDS CONTAINING 5.2% ALUMINUM STEARATE

| Time (hours): | Viscosity (cp.) |
|---|---|
| 0 (initial viscosity) | 64,000 |
| 2½ | 76,000 |
| 6 | 105,600 |
| 18 | 108,000 |
| 23 | 101,600 |
| 31 | 108,800 |
| 39 | 104,000 |
| 46 | 108,000 |
| 54 | 108,000 |
| 64 | 106,000 |
| 71 | 104,000 |
| 95 | 112,000 |
| 119 | 113,600 |
| 143 | 121,600 |
| 166 | 123,600 |
| 249 | 117,600 |
| 273 | 108,000 |
| 296 | 97,600 |
| 320 (13 days) | 84,000 |

It will be noted that after the first six hours the viscosity of the blend remained fairly constant for the next 80 hours (over three days) up to the 95 hour total; then rose slightly for the next 71 hours (about 3 more days) to the 166 hour total and then decreased slowly. This illustrates that even with 50% of the wax content as microcrystalline wax, an oxidized polyethylene wax-metallic soap blend is obtained whose viscosity remains in the high range suitable for hot melt application over a period of time generously ample to meet the storage requirements in the coating plant.

EXAMPLE 11

To determine the blocking temperatures and sealing strengths of blends of 3% aluminum tristearate with oxidized polyethylene wax alone and combined with equal parts of microcrystalline wax, in comparison with a blend of aluminum tristearate with microcrystalline wax alone, blends were prepared of these waxes with aluminum stearate as described in the foregoing examples, and the blends were conditioned to initial viscosities between about 1,000 and about 15,000 centipoises. Paper was coated on one side (by roll application) with each of the mixtures, the coating allowed to cool and congeal. The resulting coated papers were subjected to hardness tests according to ASTM Standard test method D–5–25 (100 grams/5 sec./77° F.); blocking and picking tests were made according to the tentative standard gradient test described below and a sealing strength test, recorded as the force in grams required to pull apart two adhering one-inch wide strips which have been sealed at the temperatures indicated, was made.

The 50% blocking temperature figure was determined according to a Standard "Gradient Method" which involves heating an aluminum block 36 inches long by 12 inches wide by 2 inches thick electrically at one end, and water cooling it at the other end, to establish a temperature gradient along the length of the block.

Two test strips of paper 30 inches long by 1 inch wide coated with the waxy coating under test, are placed face to face, sandwiched between sheets of uncoated paper, and are placed lengthwise on the block. A sponge rubber pad is placed over the pile and the whole assembly weighted down with a chrome plated metal block weighing 120 grams per square inch of bottom surface. Specimens are allowed to remain in the apparatus for 16 hours, then removed and pulled apart with a steady pull. The temperature at the section of the strip in which the wax surface is 50% disrupted, as determined visually, is defined as the 50% blocking point. The lowest temperature at which picking or marring occurs is defined as the pick point. For non-gloss papers such as end labels, the 50% block point is considered the non-blocking temperature; for gloss papers the pick point is used.

Results of the tests are shown in Table IV below.

*Table IV*

BLOCKING, SEALING AND HARDNESS OF PAPER COATINGS CONTAINING OXIDIZED POLYETHYLENE WAX-ALUMINUM TRISTEARATE MIXTURES COMPARED WITH COATINGS CONTAINING MICROCRYSTALLINE WAX-ALUMINUM TRISTEARATE MIXTURES

| Ingredient | Mixture | | |
|---|---|---|---|
| | A | B | C |
| Oxidized polyethylene wax | 97 | 48.5 | |
| Microcrystalline wax | | 48.5 | 97 |
| Aluminum tristearate | 3 | 3 | 3 |
| 50% Block, °F | 127 | 127 | 98 |
| Seal Temp., °F | 230 | 220 | 190 |
| Seal Strength, gms | 39 | 36 | tear |
| Penetration, mm | 1.0 | 1.7 | 3.0 |
| Pick Points, °F | 102 | 104 | 88 |

The process of my invention in effect provides a method for increasing the melt viscosities of a wide variety of oxidized polyethylene wax-containing compositions of inherently low melt viscosities, and rendering them adaptable for extrusion or hot-melt coating at the desired optimum high melt viscosity for the particular application.

Thus, oxidized polyethylene wax compositions which per se would be totally unsuited for many such applications are brought within the realm of usefulness for these purposes, and the inadequacies of such micro-crystalline wax compositions are overcome. The resulting compositions are useful for application to a wide variety of base surfaces, including paper, paper board, metals, cellophane, synthetic films such as vinyl and other polymers, etc. The high melt viscosities of the compositions render them substantially non-penetrating into porous surfaces such as paper and enable thick coats to be applied in a single application. The compositions are extremely adhesive and tacky at the elevated temperatures at which they are applied, adhering strongly to all surfaces including metals, and become hard and tough on cooling, setting up to hard, tough, flexible, adherent non-tacky films.

It is, moreover, apparent that extremely small quantities of metallic soaps may be used to effect enormous increases in the melt viscosities of the oxidized polyethylene wax, these viscosity increases being enormously greater than produced on the melt viscosities of microcrystalline waxes by the same amounts of soap. Thus, while 5% aluminum stearate used with microcrystalline wax produces a coating having a maximum melt viscosity of only about 34,000 centipoises, the same or lesser amount of aluminum stearate used with oxidized polyethylene wax, is capable of producing a coating having a melt viscosity up to 228,000 centipoises when heat conditioned. Similarly, 10% of aluminum stearate used with microcrystalline wax produces a composition with a maximum melt viscosity of 250,000 centipoises whereas 10% of aluminum stearate used with oxidized polyethylene wax results in a coating having an initial viscosity of over a million centipoises, capable of producing a still higher viscosity on heat conditioning.

The resulting coatings, however (except those containing mineral oils), are readily heat sealable, i.e., they can be sealed to themselves, or other surfaces by the application of heat and pressure, but at ordinarily employed temperatures are hard and tack-free so as to be substantially non-blocking, i.e. not adherent to themselves under pressure at normal or even slightly elevated temperatures, and thus do not require dusting or other spacing treatment before reeling or piling sheets in storage.

Their strong adhesion to metals and hardness render them well adapted for use in coating the interiors of metal cans such as beverage cans and for coating the interior of food containers to be used in the packaging of moist food and the like.

The inherently high hardness and non-blocking characteristics of the oxidized polyethylene waxes are substantially preserved, since only small proportions of metallic soaps are sufficient to produce the required increase in viscosity characteristics.

While the above describes the preferred embodiments of my invention, it will be understood that departures may be made therefrom within the scope of the specification and claims.

I claim:

1. A composition of matter comprising at least about 50% of oxidized polyethylene wax containing between about 2% and about 7% of oxygen, having an acid number between about 11 and about 20 and an average molecular weight between about 1,000 and about 5,000, and a minor proportion of between about 1% and about 10%, by weight based on the weight of the oxidized polyethylene wax of a water-insoluble aluminum salt of a staurated, aliphatic monocarboxylic acid having from 8 to 20 carbon atoms, the balance of the composition being made up of conventional hot melt coating additives, said compositon being substantially anhydrous and having a potential melt viscosity at temperatures between about 230° F. and about 300° F. of at least about 1,000 centipoises.

2. A composition of matter containing a total of at least about 50% of an aluminum soap-thickenable material selected from the group consisting of oxidized polyethylene wax, microcrystalline wax, mineral oil and mixtures thereof, said oxidized polyethylene wax having an average molecular weight between about 1,000 and about 5,000, an oxygen content between about 2% and about 7% and an acid number between about 11 and about 20 and being present in an amount of at least about 5% based on the weight of the total composition, together with between about 1% and about 10% based on the weight of the soap-thickenable material, of a water insoluble aluminum salt of a saturated, aliphatic monocarboxylic acid having from 8 to 20 carbon atoms, the balance of the composition being made up of conventional hot melt coating additives, said composition being substantially anhydrous and having a potential melt viscosity at temperatures between about 230° F. and about 300° F. of at least about 1,000 centipoises.

3. The composition according to claim 2 wherein the aluminum salt of the higher aliphatic acid is aluminum distearate.

4. The composition according to claim 2 wherein the aluminum salt of the higher aliphatic acid is aluminum octoate.

5. A substantially anhydrous composition of matter comprising at least about 50% of an oxidized polyethylene wax containing between about 2% and about 7% of oxygen, having an acid number between about 11 and about 20 and an average molecular weight between about 1,000 and about 5,000 and between about 1% and about 10% based on the weight of the oxidized polyethylene wax of a water-insoluble aluminum salt of a saturated, aliphatic monocarboxylic acid having from 8 to 20 carbon atoms, the balance of the composition being made up of conventional hot melt coating additives, and capable of conversion on heating successively to a thixotropic dough and to a smooth, viscous, flowable liquid having a viscosity of at least about 1,000 centipoises at temperatures between about 230 and about 300° F.

6. A substantially anhydrous composition adapted to be applied in hot molten condition to a base surface, comprising a total of at least about 50% of an aluminum-soap-thickenable material selected from the group consisting of oxidized polyethylene wax, microcrystalline wax, mineral oil and mixtures thereof, said oxidized polyethylene wax having an average molecular weight between about 1,000 and about 5,000, an oxygen content between about 2% and about 7%, an acid number between about 11 and about 20, and being present in an amount between about 5% and about 99% of the total composition, and between about 1% and about 10% by weight based on the weight of total thickenable material, of an aluminum salt of a saturated, aliphatic, monocarboxylic acid having from 8 to 20 carbon atoms, the balance of the composition being made up of conventional hot metal coating additives, said composition having a viscosity at about 260° F. between about 1,000 centipoises and about 2,000,000 centipoises.

7. A substantially anhydrous composition of matter adapted to be applied in hot molten condition to a base surface, comprising between about 50% and about 99% of an oxidized polyethylene wax having an acid number between about 11 and about 20 and an average molecular weight between about 1,000 and about 5,000 and having an oxygen content between about 2% and about 7%, and between about 1% and about 10% based on the weight of the oxidized polyethylene wax of an aluminum salt of a saturated, aliphatic, monocarboxylic acid, having from 8 to 20 carbon atoms, the balance of the composition being made up of conventional hot melt coating additives, said composition having a viscosity at about 260° F. between about 1,000 centipoises and about 50,000 centipoises.

8. The composition according to claim 7 wherein the oxidized polyethylene wax is an oxidized polyethylene/isopropanol telomer wax having an average molecular weight between about 1,000 and about 3,000.

9. A substantially anhydrous composition of matter comprising at least about 50% of aluminum soap-thickenable material selected from the group consisting of oxidized polyethylene wax, microcrystalline wax, and mixtures thereof, at least about 10% of which is an oxidized polyethylene wax containing between about 2% and about 7% of oxygen, having an acid number between about 11 and about 20 and having an average molecular weight between about 1,000 and about 5,000, and between about 1% and about 10% based on the weight of the thickenable material, of an aluminum salt of a saturated aliphatic monocarboxylic acid having from 8 to 20 carbon atoms, the balance of the composition being made up of conventional hot melt coating additives, said composition having a viscosity at 260° F. of between about 1,000 centipoises and about 2,000,000 centipoises.

10. A substantially anhydrous composition of matter comprising between about 5% and about 98% of an oxidized polyethylene wax containing between about 2% and about 7% of oxygen, having an acid number between about 11 and about 20 and an average molecular weight between about 1,000 and about 5,000 between about 45% and about 1% of microcrystalline wax, the total of oxidized polyethylene wax and microcrystalline wax amounting to at least about 50% of the composition, and between about 1% and about 10% based on the total weight of the waxes, of an aluminum stearate, the balance of the composition being made up of conventional hot-melt coating additives, said composition having a melt viscosity at 260° F., between about 1,000 and about 2,000,000 centipoises.

11. A process for preparing a composition of controlled high melt viscosity characteristics which comprises melting an aluminum soap-thickenable material selected from the group consisting of oxidized polyethylene wax containing between about 2% and about 7% of oxygen, having an acid number between about 11 and about 20 and an average molecular weight between about 1,000 and about 5,000, microcrystalline wax, mineral oil and mixtures thereof and containing at least about 5% of said oxidized polyethylene wax, adding thereto and dispersing therein at a temperature within about 30° F. of the melting point of the wax, a small quantity of a water-insoluble aluminum salt of a saturated, aliphatic, monocarboxylic acid having from 8 to 20 carbon atoms, raising the temperature of the mixture to a point at which the mixture sets to a thixo-tropic dough and continuing the heating until the mixture becomes a flowable viscous liquid.

12. A process for preparing a coating composition of controlled high melt viscosity characteristics which comprises melting an oxidized polyethylene wax containing between about 2% and about 7% of oxygen, having an acid number between about 11 and about 20 and an average molecular weight between about 1,000 and about 5,000, adding thereto and dispersing therein at a temperature within about 20° F. of the melting point of the wax, between about 1% and about 10% based on the weight of the oxidized polyethylene wax, of a water-insoluble aluminum salt of a saturated, aliphatic, monocarboxylic acid having from 8 to 20 carbon atoms, raising the temperature of the mixture to the temperature at which it becomes a thixotropic dough, continuing the heating at a higher temperature not in excess of about 350° F., until the dough is converted into a flowable viscous liquid having viscosity characteristics between about 1,000 cp. and about 2,000,000 centipoises.

13. The process of claim 12, wherein the salt of the acid is an aluminum stearate.

14. The process of claim 12, wherein the salt of the acid is aluminum octoate.

15. A process for preparing a coating composition of controlled high melt viscosity characteristics which comprises melting an oxidized polyethylene-isopropanol telomer wax having an acid number between about 11 and about 20 and an average molecular weight between about 1,000 and about 3,000, adding thereto and dispersing therein at a temperature within about 30° F. of the melting point of the wax, between about 3% and about 5% based on the weight of the oxidized polyethylene wax of a water insoluble aluminum salt of a saturated, aliphatic, monocarboxylic acid having from 8 to 20 carbon atoms, raising the temperature to that at which it becomes a thixotropic dough, continuing the heating at a higher temperature not in excess of about 350° F., until the dough is converted into a viscous liquid having viscosity characteristics between about 1,000 cp. and about 228,000 centipoises.

References Cited in the file of this patent

UNITED STATES PATENTS

| | | |
|---|---|---|
| 2,320,644 | Nill | June 1, 1943 |
| 2,466,672 | Habib | Apr. 12, 1949 |
| 2,712,534 | Erchak | July 5, 1955 |
| 2,728,735 | Anderson | Dec. 27, 1955 |
| 2,754,278 | Wilson et al. | July 10, 1956 |
| 2,766,214 | Erchak et al. | Oct. 9, 1956 |
| 2,794,040 | Annable et al. | May 28, 1957 |
| 2,842,454 | Short | July 8, 1958 |

OTHER REFERENCES

"Modern Plastics," vol. 30, No. 6, February 1953, pp. 129, 130, 132, 134 and 218.